United States Patent [19]
Suzuki et al.

[11] Patent Number: 5,172,152
[45] Date of Patent: Dec. 15, 1992

[54] FOCAL PLANE SHUTTER

[75] Inventors: Akira Suzuki; Hiroshi Miyazaki, both of Tokyo, Japan

[73] Assignee: Copal Company Limited, Tokyo, Japan

[21] Appl. No.: 723,275

[22] Filed: Jun. 28, 1991

[30] Foreign Application Priority Data

Jun. 30, 1990 [JP] Japan ................................ 2-69797[U]
Jun. 30, 1990 [JP] Japan ................................ 2-69798[U]
Jun. 30, 1990 [JP] Japan ................................ 2-173104
Aug. 25, 1990 [JP] Japan ................................ 2-88479[U]

[51] Int. Cl.$^5$ .............................................. G03B 9/40
[52] U.S. Cl. .................................................... 354/247
[58] Field of Search ............... 354/245, 246, 247, 248, 354/249, 234.1, 235.1

[56] References Cited

U.S. PATENT DOCUMENTS 4,975,722 12/1990 Suzuki et al. ...................... 354/246

Primary Examiner—Richard A. Wintercorn
Assistant Examiner—Cassandra C. Spyrou
Attorney, Agent, or Firm—Wenderoth, Lind & Ponack

[57] ABSTRACT

A focal plane shutter includes a reversing lever mounted on a shaft disposed on a driving lever for opening and closing a blade group constituting the focal plane shutter so that a relative rotation range of the reversing lever with respect to the driving lever is restricted. Energizing means for energizing the driving lever toward the end of forward movement is directly engaged with the reversing lever. Further, a cam follower is disposed on the reversing lever between the shaft mounting the reversing lever and the engagement point of the reversing lever with the energizing means. Energizing force acting on the reversing lever is transmitted to the driving lever through the reversing lever to move the driving lever toward the end of forward movement. Motion of the cam follower is restrained by a cam profile while the driving lever is moved toward the end of forward movement, so that the energizing force acting on the reversing lever is reversed at the cam follower serving as a fulcrum and is transmitted to the driving lever as braking force. Accordingly, shock and oscillation at the end of forward movement are reduced.

10 Claims, 11 Drawing Sheets

FOCAL PLANE SHUTTER

BACKGROUND OF THE INVENTION

The present invention relates to a driving mechanism for a focal plane shutter, and more particularly to a driving mechanism for a focal plane shutter provided with a shock absorption mechanism capable of effectively absorbing shock at the end of forward movement of each blade group constituting the focal plane shutter with a simple structure.

A focal plane shutter for a recent single lens reflex camera attains high-speed operation of shutter blades in order to stabilize the exposure accuracy in a short exposure time and increase the synchronization speed of the electronic flash.

For example, a shutter was moved across a vertical distance of 24 mm from an upper end to a lower end of an aperture of a frame of a 35 mm type camera in about 7 ms several years ago, whereas it has been adapted to be moved in about 3 ms recently.

On the other hand, it is well known that operation sound and oscillation at the end of forward movement of the shutter blades are increased as the blade speed is increased. A focal plane shutter having a high blade speed requires an effective shock absorption mechanism.

A conventional shock absorption mechanism which includes a brake lever disposed in a path through which a blade driving member passes and pressed between a friction plate and a leaf spring so that the brake lever is rotated by striking the blade driving member against the brake lever and the kinetic energy of the blade driving member and the shutter blades is converted into thermal energy by friction of the friction plate and the brake lever to absorb shock is generally known.

However, the above-mentioned friction type shock absorption mechanism has many problems as described below.

The coefficient of friction between the members is effected by variation in temperature and aging and accordingly the shock absorption performance tends to be varied.

Since the brake lever and the friction plate for the shock absorption are provided in addition to the shutter driving mechanism, the number of components are increased and the space factor is reduced.

The shock absorption mechanism must also be set at the time of the setting operation in addition to the shutter driving mechanism and accordingly the setting force is increased.

U.S. Pat. No. 4,975,722 discloses a mechanism for utilizing a single spring as a source of driving force and a source of braking force. However, in accordance with this patent, since a blade driving lever 18 and blade brake lever 15, the number of components is increased and the space factor is reduced.

BRIEF SUMMARY OF THE INVENTION

The present invention has been made in view of the above problem, and it is an object of the present invention to provide a driving mechanism for a focal plane shutter including a shock absorption mechanism having stable shock absorption performance, reduced space requirements and no necessity of increasing the setting force.

The driving means of the present invention is used with a focal plane shutter including a blade group for opening and closing the aperture which is formed in a shutter base plate.

The blade group includes a plurality of individual blades and is driven by a driving lever between the unfolded state for closing the aperture and the overlapped state for opening the aperture.

The driving lever is swingably mounted about an axis which is disposed on the base plate.

According to the present invention, a reversing lever is swingably mounted about an axis disposed on the driving lever at a position different from the axis about which the driving lever itself is swingable and the reversing lever has a restricted relative rotation range with respect to the driving lever. Furthermore, an operation end of a driving spring is engaged with a free end of the reversing lever to urge the reversing lever toward an end of forward movement of the driving lever. Accordingly, the force exerted by the driving spring is transmitted to the driving lever through the reversing lever.

More particularly according to the present invention, the force exerted by the driving spring is transmitted to the driving lever through the reversing lever as a driving force in a former region of a movement path of the driving lever and as a braking force in a latter region of the movement path of the driving lever.

A cam follower is disposed on the reversing lever between the axis around which the reversing lever swings and the free end of the reversing lever and with which the driving spring is engaged. The movement of the reversing lever is controlled by the cam profile of a cam means.

This cam profile includes a first portion for leading the cam follower along an arcuate locus about the axis of pivoting of the driving lever in a former region of the movement path of the driving lever from an initial position of the driving lever to the end of forward movement, and a second portion for restraining the rotation of the cam follower about the axis of pivoting of the driving lever in a latter region of the movement path of the driving lever from the initial position of the driving lever to the end of forward movement.

Furthermore, the driving lever is attracted to a releasing magnet at its initial position.

Accordingly, when the driving lever is released and is moved from the initial position of the driving lever toward the end of forward movement, the reversing lever is moved together with the driving lever, and the cam follower provided on the reversing lever is moved along the arcuate locus about the axis of pivoting of the driving lever in the former region of movement of the driving lever.

The cam follower provided on the reversing lever comes into contact with the second cam profile portion before the driving lever reaches the end of forward movement.

The driving lever continues to be moved by the force of inertia even after the cam follower has come into contact with the second portion, while, since the cam follower is disposed between the point at which the reversing lever is mounted on the driving lever and the point at which the driving spring is engaged therewith, the force of the driving spring is reversed with the cam follower serving as a fulcrum and is transmitted to the driving lever after the cam follower has come into contact with the second cam profile portion. Accordingly, a braking force is exerted on the driving lever and shock and oscillation at the end of forward movement are reduced.

Accordingly, in the present invention, since a single driving spring is utilized as a source of driving force for moving the driving lever until the middle of movement of the driving lever and is utilized as a source of force for braking the driving lever from the middle of the movement of the driving lever, it is not necessary to provide a braking spring separately, and space for locating a braking mechanism is reduced.

DETAILED DESCRIPTION OF THE PREFERRED EMBODIMENTS

An embodiment of the present invention will now be described in detail with reference to the drawings.

Figure 1:
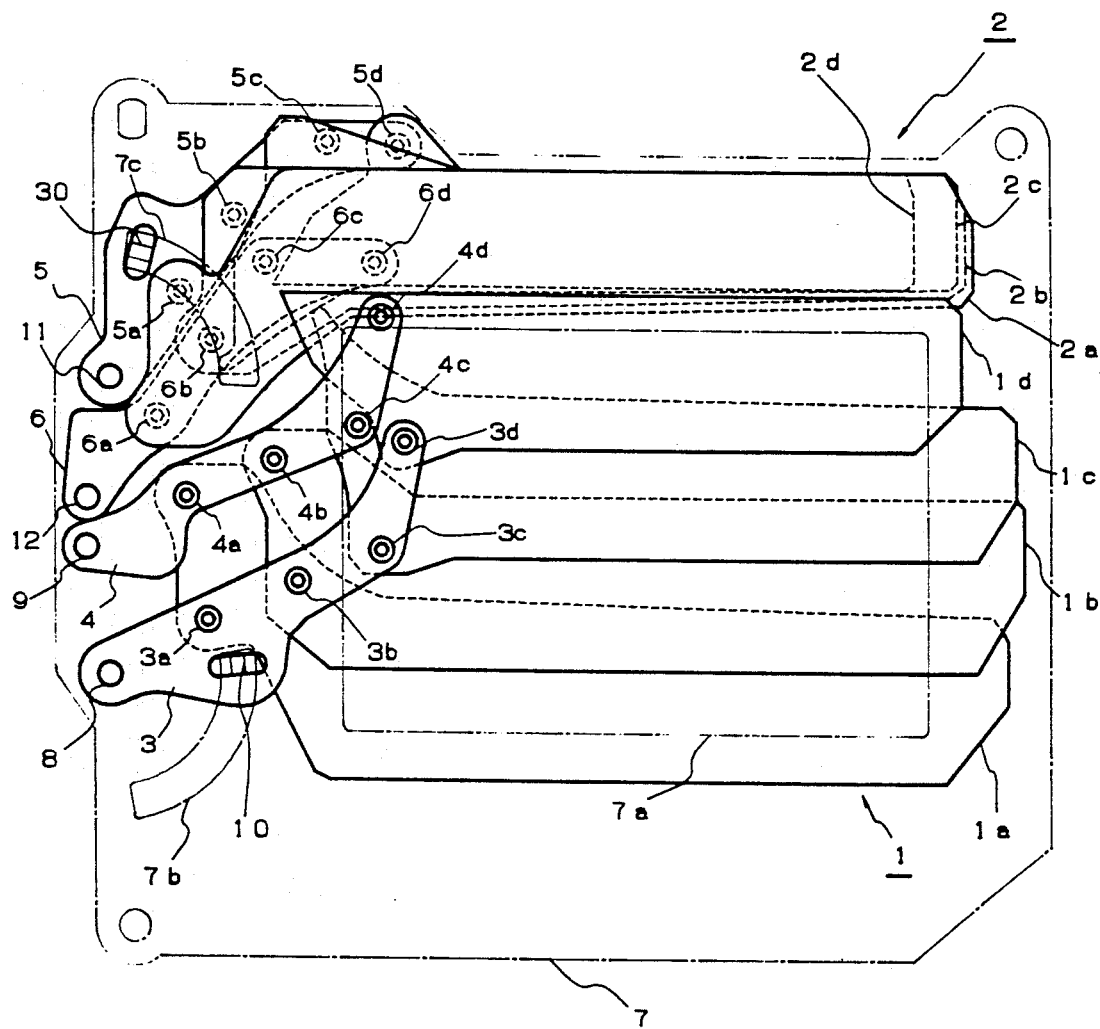
FIG. 1 is a plan view of a peripheral mechanism of shutter blades of a focal plane shutter according to an embodiment of the present invention.

FIG. 1 is a plan view showing an initial state of blade groups including a first blade group 1 and a second blade group 2 for a focal plane shutter according to an embodiment of the present invention, coupling levers 3 and 4 for moving the first blade group 1 and coupling levers 5 and 6 for moving the second blade group 2.

In the initial state, the first blade group 1 is in the spread state and the second blade group 2 is in the overlapped state. Accordingly, in the initial state, an aperture 7a for exposure formed in the middle of a base plate 7 is closed by the first blade group 1. The base plate 7 is disposed in front of mechanical members shown in FIG. 1 and thus the base plate 7 is shown by a one-dot chain line in phantom in FIG. 1.

The coupling levers 3 and 4 are swingably supported on the base plate 7 by means of shafts 8 and 9, respectively.

Blades 1a, 1b, 1c and 1d constituting the first blade group 1 are rotatably mounted on the coupling lever 3 by means of machine screws 3a, 3b, 3c and 3d, respectively, and also rotatably mounted to the coupling lever 4 by means of machine screws 4a, 4b, 4c and 4d, respectively. The coupling levers 3 and 4 together with each of the blades 1a, 1b, 1c and 1d form a parallel linkage.

A bend portion 10 (described later) extending into a slot 7b formed in the base plate 7 is engaged with the coupling lever 3. When the bend portion 10 is moved down along the slot 7b, the coupling lever 3 is rotated clockwise about the axis 8 and the coupling lever 4 is also rotated clockwise about the axis 9 in interlocked relationship with the rotation of the coupling lever 3 so that the blades 1a, 1b, 1c and 1d are moved downward to open the aperture 7a.

Similarly, the coupling levers 5 and 6 are swingably supported on the base plate 7 by means of the shafts 11 and 12, respectively.

Blades 2a, 2b, 2c and 2d are rotatably mounted on the coupling lever 5 by means of machine screws 5a, 5b, 5c and 5d, respectively, and also rotatably mounted on the coupling lever 6 by means of machine screws 6a, 6b, 6c and 6d, respectively. The coupling levers 5 and 6 together with each of the blades 2a, 2b, 2c and 2d form a parallel linkage.

A bend portion 30 extending into a slot 7c formed in the base plate 7 is engaged with the coupling lever 5. When the bend portion 30 is moved down along the slot 7c, the coupling lever 5 is rotated clockwise about the shaft 11 and the coupling lever 6 is rotated clockwise about the shaft 12 in interlocked relationship with the rotation of the coupling lever 5 so that the blades 2a, 2b, 2c and 2d are moved down to close the aperture 7a.

In such a focal plane shutter, a time difference between the start of the movement of the first blade group 1 and the start of the movement of the second blade group 2 corresponds to the exposure time. Thus, in order to stabilize the exposure accuracy for a short exposure time and increase the synchronization speed of the electronic flash, it is necessary to increase the velocity of movement of the first and second blade groups 1 and 2.

However, when the velocity of movement of the blade groups is increased, strong shock and oscillation are produced at the end of forward movement of the blade groups.

The present invention provides a novel shock absorption mechanism for absorbing shock at the end of forward movement. Its actual structure will now be described with reference to the first embodiment shown in FIGS. 2–8 and the second embodiment shown in FIGS. 9–12.

Further, mechanical elements shown in FIGS. 2–8 include many elements energized by springs. However, in order to avoid complicating the drawings, springs other than important springs are illustrated only by arrows indicating the force direction.

First of all, a driving mechanism for the first blade group is described.

A first blade driving lever 15 having a rear surface on which the above-described bend portion 10 is formed is swingably supported on a shaft 14 disposed on the base plate 7. A reversing lever 16 is swingably mounted on a shaft 15a disposed on the rear surface of the first blade driving lever 15. The reversing lever 16 serves to transmit driving force to the first blade group 1 in the first half region or the former region of the movement of the first blade group 1 and to transmit braking force to the first blade group 1 in the second half region or the latter region.

A bend portion 18a formed at an end of the reversing lever 16 extends into a hole 15b formed in the first blade driving lever 15. Accordingly, the relative range of rotation of the reversing lever 16 with respect to the first blade driving lever 15 is restricted by the hole 15b.

A free end 17a of a driving torsion spring 17 is engaged with the bend portion 16a and a fixed end of the torsion spring 17 is engaged with a pin 18 fixedly mounted to a camera body (not shown).

Accordingly, force exerted on the reversing lever 16 by the torsion spring 17 is transmitted to the first blade driving lever 15 as clockwise rotation force about the shaft 14 through the bend portion 16a and an edge 15c (see FIG. 4 et seq) of the hole 15b.

A cam follower 19 having the function of a set roller is rotatably mounted on the rear surface of the reversing lever between the shaft 15a and the bend portion 16a. A cam means in the form of a groove cam 20 that the cam follower 19 follows is formed in the base plate 7.

A first arcuate cam profile portion 20a (see FIG. 4 et seq) for leading the cam follower 19 along a circular arc about the shaft 14 is formed in the first half portion of the groove cam 20 while a second cam profile portion 20b for restraining continuation of rotation of the cam follower 19 about the swinging shaft 14 of the first blade driving lever 15 is formed in the second half portion of the groove cam 20.

The embodiment is characterized in that the shape of the groove cam 20 is formed so that the cam follower 19 reaches the second cam profile portion 20b from the first portion 20a of the groove cam 20 before the first blade driving lever 15 is moved to the end of forward movement in the clockwise rotation of the first blade driving lever 15 itself. Further, the embodiment is further characterized in that the groove cam 20 is formed in the shape of an obtuse angle defined by tangent lines to the first portion 20a and the second portion 20b at a connection point thereof.

A driving mechanism for the second blade group will now be described.

In the embodiment, the driving mechanism for the second blade group is substantially the same as the driving mechanism for the first blade group and accordingly elements of the driving mechansim of the second blade group are designated by reference numerals obtained by adding "20" to the reference numerals given to the corresponding elements of the driving mechanism of the first blade group to simplify the description.

A second blade driving lever 35 having a rear surface on which the above-described bend portion 30 is formed is swingably supported on a shaft 34 of the base plate 7 and a rversing lever 36 is swingably mounted on a shaft 35a on the rear surface of the second blade driving lever 35.

A bend portion 36a formed at an end of the reversing lever 36 extends into a hole 35b formed in the second blade driving lever 35 and accordingly the relative range of rotation of the reversing lever 36 with respect to the second blade driving lever is restricted by the hole 35b.

A free end 37a of a driving torsion spring 37 is engaged with the bend portion 36a and a fixed end of the torsion spring 37 is engaged with a pin 38.

Accordingly, force exerted on the reversing lever 36 by the torsion spring 37 is transmitted to the second blade driving lever 35 through the bend portion 36a and edge 35c (see FIG. 4 et seq) of the hole 35b as clockwise rotation about the shaft.

A cam follower is mounted on the rear surface of the reversing lever and a groove cam 40 that the cam follower 39 follows is formed in the base plate 7.

A first cam profile portion 40a for leading the cam follower 39 along a circular arc about the shaft 34 is formed in the first half portion of the groove cam 40 while a second portion 40b for restricting continuation of rotation of the cam follower 39 about the swinging shaft 39 is formed in the second half portion of the groove cam 40.

Reference numeral 41 denotes a set lever for initializating the operation of the shutter mechanism.

The set lever 41 is swingably supported on a shaft 42 and is coupled with a set cam 44 through a set link 43. Further, counterclockwise force is exerted on the set lever 41 by a spring S1.

When the set lever 41 is rotated clockwise about the shaft 42 against the counterclockwise force of the spring S1, the set cam 44 is rotated clockwise about a shaft 45.

A cam surface 44a formed on the set cam 44 abuts against the above-described cam follower 19 in the clockwise rotation of the set cam 44 to rotate the first blade driving lever 15 counterclockwise. A cam surface 44b formed on the set cam 44 abuts against the above-described cam follower 39 in the clockwise rotation of the set cam 44 to rotate the second blade driving lever 35 counterclockwise.

Numeral 46 designates a first blade stopper for engaging the first blade driving lever 15 when the first blade group finishes movement, and numeral 47 designates a second blade stopper for engaging the second blade driving lever when the second blade group finishes movement. The first and second blade stoppers 46 and 47 are on shafts 48 and 49, respectively. Clockwise rotation force is exerted on the first and second blade stoppers 46 and 47 by springs S2 and S3, respectively. The detailed operation of the first and second blade stoppers 46 and 47 is described later. Numerals 50 and 51 designate magnets for electromagnetic release.

Operation of the embodiment will now be described with reference to the foregoing description.

Figure 2:
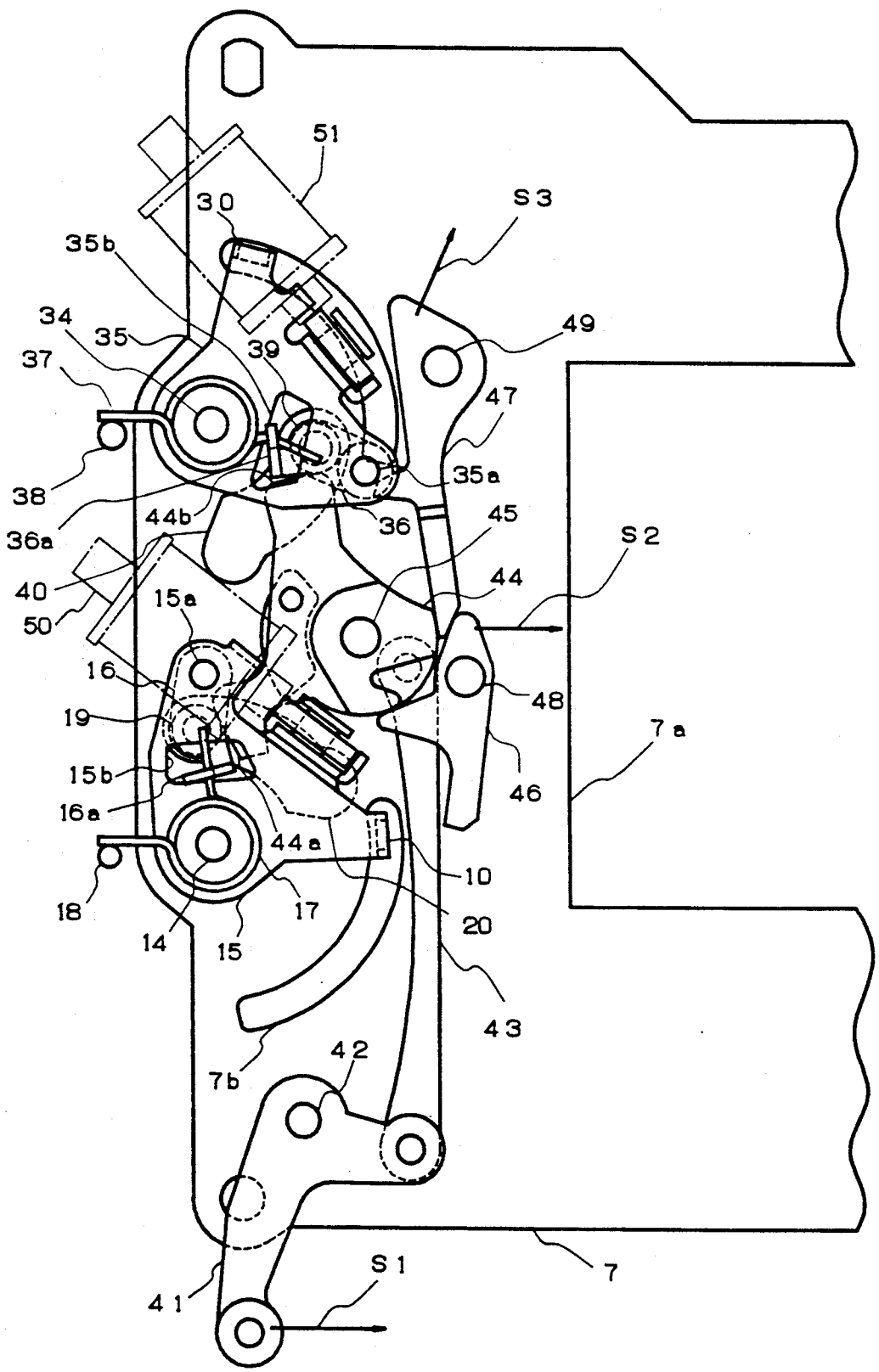
FIG. 2 is a plan view showing a shutter driving mechanism in a shutter set state according to an embodiment of the present invention.
Figure 3:
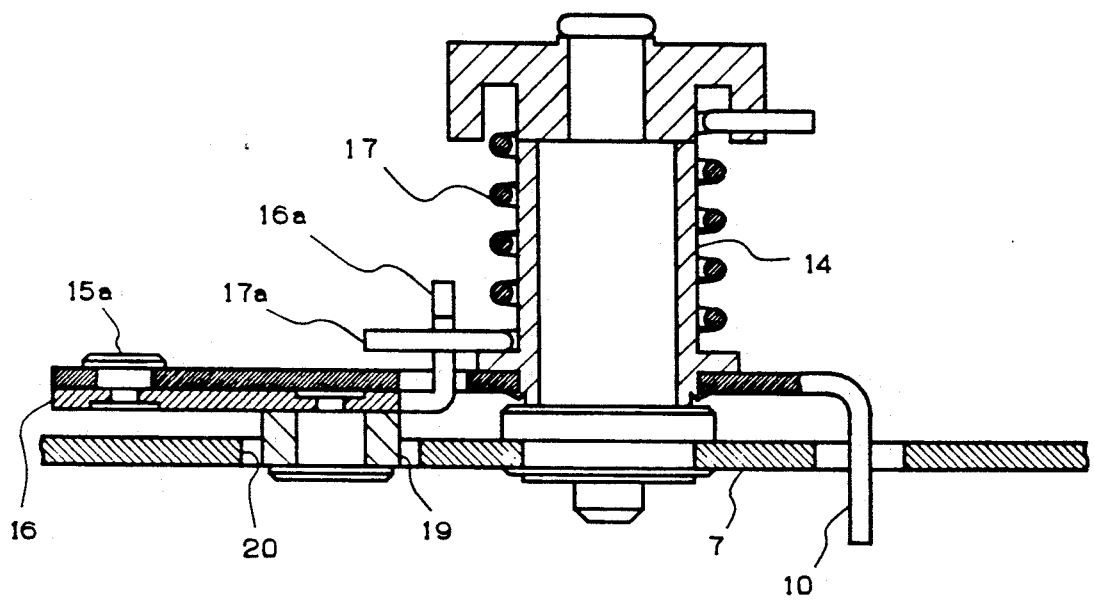
FIG. 3 is a sectional view of a driving mechanism of a first blade side in the mechanism shown in FIG. 2.
Figure 4:
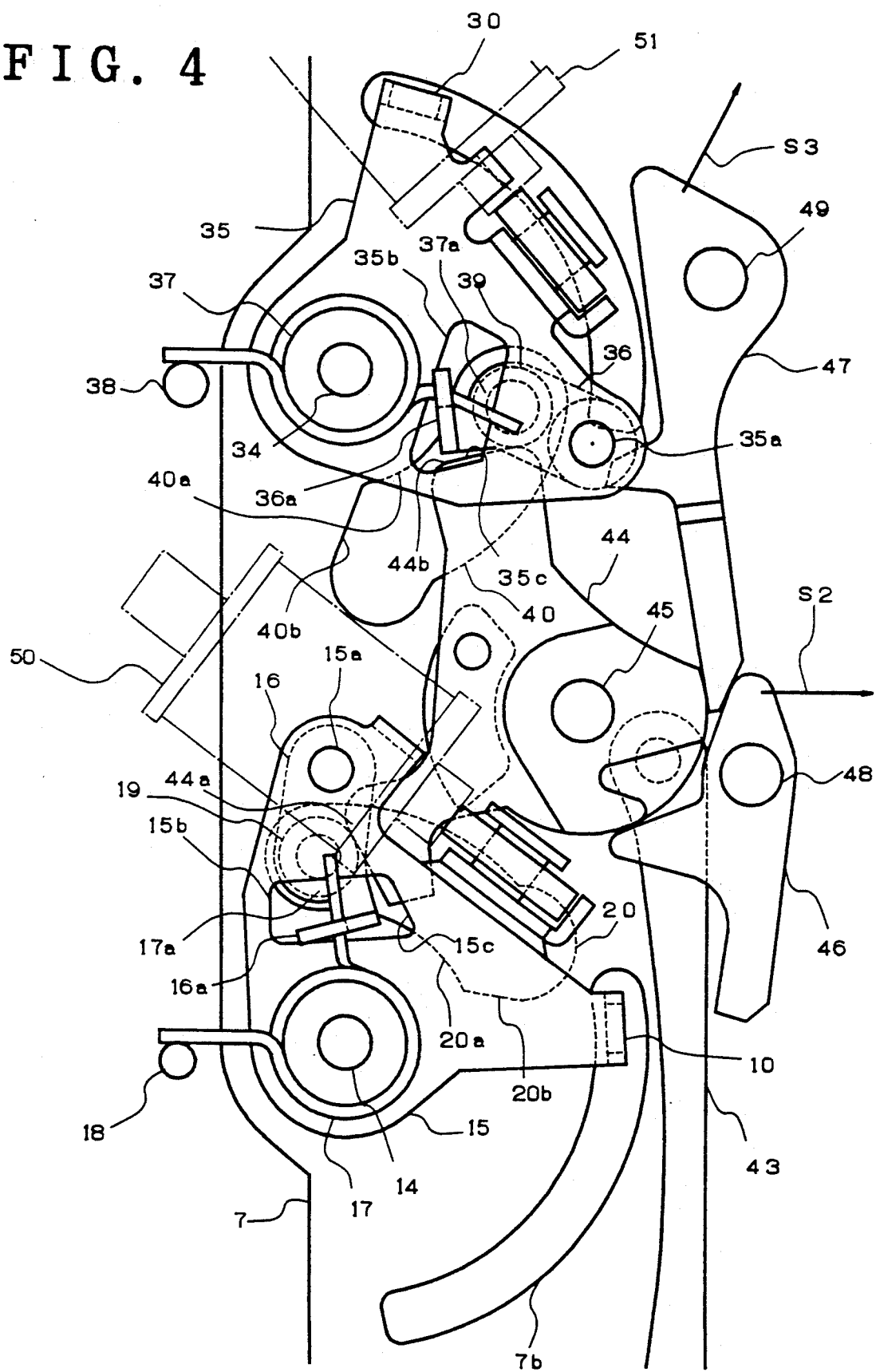
FIG. 4 is a partial plan view of the mechanism shown in FIG. 2.

In the initial state, the peripheral mechanism of the shutter blade is in the state shown in FIG. 1 and its driving mechanism is in the state shown in FIGS. 2 and 4.

In the initial state, the counterclockwise rotation force exerted on the set lever 41 by the spring S1 is transmitted to the set cam 44 through the set link 43 as counterclockwise rotation force, while the set cam 44 is engaged with a mechanical release lever (not shown) and the counterclockwise rotation of the set cam 44 is restricted in the state of the apparatus as shown in FIGS. 2 and 4.

When the set cam 44 is released form the release lever (not shown) in the state of FIG. 2, the counterclockwise rotation force exerted on the set lever 41 by the spring S1 is transmitted to the set cam 44 through the set link 43 to rotate the set cam 44 counterclockwise.

When the set cam 44 is rotated counterclockwise, the cam surface 44a of the set cam 44 is separated from the cam follower 19 for the first blade group and the cam surface 44b of the set cam 44 is separated from the cam follower 39 for the second blade group.

Accordingly, the reversing lever 16 is rotated counterclockwise about the shaft 15a by the force of the torsion spring 17 so that the bend portion 16a abuts against the edge 15c of the hole 15b formed in the first blade driving lever 15 to exert clockwise rotation force on the first blade driving lever 15. Similarly, the reversing lever 36 is rotated counterclockwise about the shaft 35a by the force of the torsion spring 37 so that the bend portion 36a abuts against the edge 35c of the hole 35b formed in the second blade driving lever 35 to exert clockwise rotation force on the second blade driving lever 35.

Figure 5:
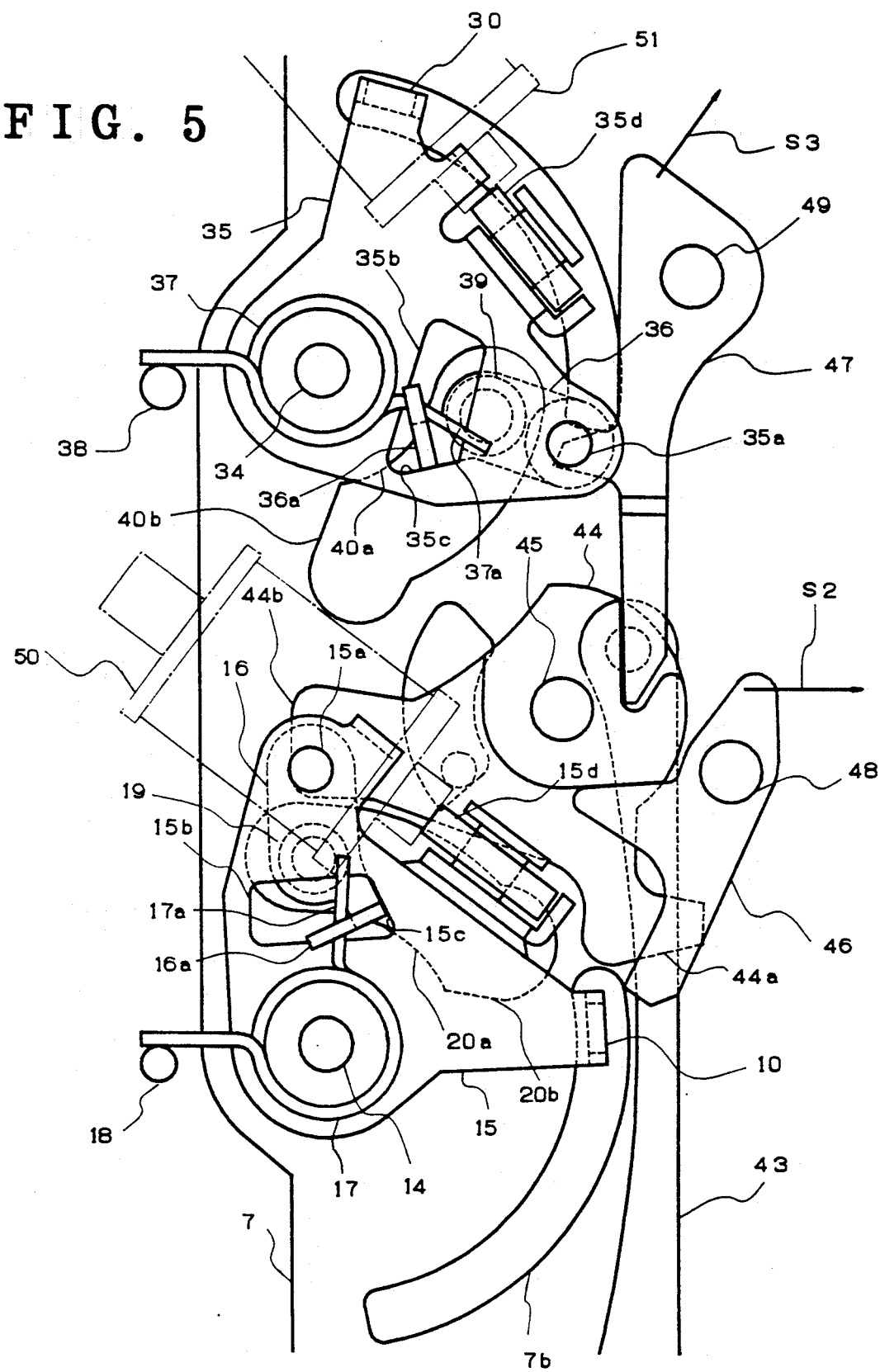
FIG. 5 is a partial plan view of the mechanism shown in FIG. 2 in which the first blade has not started to move.

The state at this time is shown in FIG. 5.

However, in the state shown in FIG. 5, since an iron piece 15d provided on the first blade driving lever 15 is attracted to the magnet 50 and an iron piece 35d provided on the second blade driving lever 35 is attracted to the magnet 51, the first and second blade groups 1 and 2 are maintained in the initial state.

After the set cam 44 is released, the magnets 50 and 51 are sequentially demagnetized with a time difference corresponding to an exposure time.

With the first blade group, the force of the spring 17 is transmitted to the first blade driving lever 15 through the bend portion 16a of the reversing lever 16 and the edge 15c of the hole and the first blade driving lever 15 is rotated clockwise about the axis 14.

Accordingly, since the bend portion 10 formed on the rear surface of the first blade driving lever 15 is moved down along the slot 7b, the coupling lever 3 is rotated clockwise about the shaft 8 and the coupling lever 4 is also rotated clockwise about the shaft 9 in interclocked relationship with the rotation of the coupling lever 3. Accordingly, the blades 1a, 1b, 1c and 1d constituting the first blade group 1 are moved down to open the aperture 7a.

Since the first cam profile portion 20a having a circular arc about the shaft 14 is formed in the first half portion of the groove cam 20, the reversing lever 16 is rotated about the shaft 14 together with the first blade driving lever 15 as far as the cam follower 19 passes along the first portion 20a.

While the reversing lever 16 is rotated together with the first blade driving lever 15, the cam follower 19 approaches from the first portion 20a to the second portion 20b of the groove cam 20 before the first blade driving lever 15 reaches the end of forward movement.

After the cam follower 19 reaches the second portion 20b, the first blade driving lever 15 continues to be rotated to the end of forward movement by the force of inertia of the first blade driving lever 15 itself and the force of inertia of the mechanism associated with the first blade group 1. Thus, the portion of the shaft 15a of the reversing lever 16 continues to be rotated together with the first blade driving lever 15.

On the other hand, the rotation of the portion of the cam follower 19 about the shaft 14 is restrained by the second cam profile portion 20b and accordingly the reversing lever 16 is rotated clockwise about the shaft 15a relatively to the first blade driving lever 15. Thus, since the bend portion 16a formed on the reversing lever 16 is separated from the edge 15c of the hole 15b of the first blade driving lever 15, the clockwise rotation force of the torsion spring 17 is no longer transmitted to the first blade driving lever 15.

Furthermore, even at this time, since the free end of the torsion spring 17 is engaged with the bend portion 16a of the reversing lever 16, the force exerted by the torsion spring 17 on the bend portion 16a of the reversing lever 16 is reversed at the cam follower 19 serving as a fulcrum and is transmitted to the shaft 15a of the reversing lever 16. Accordingly, the force is exerted on the first blade driving lever 15 as a counterclockwise rotation force (that is, braking force) about the shaft 14.

In this manner, in the embodiment, the first blade driving lever 15 is moved to the end of forward movement by the force of inertia of the lever 15 itself and the mechanism associated with the first blade group even after the cam follower 19 has approached the second cam profile portion 20b from the first portion 20a of the groove cam 20, although the force from the torsion spring 17 is not exerted and is reversed by the reversing lever 16 to be transmitted as the braking force after the cam follower has approached the second cam profile portion 20b from the first portion 20a of the groove cam 20, shock and oscillation at the end of movement is greatly reduced.

Then, an engagement projection 15e formed on the first blade driving lever 15 is engaged with the first blade stopper 48 so that the first blade driving lever 15 is stopped.

The operation of the driving mechanism of the second blade group is quite the same as that of the first blade group, and an engagement projection 35e formed on the second blade driving lever 35 is engaged with the second blade stopper 47 so that the second blade driving lever 35 is stopped.

Figure 6:
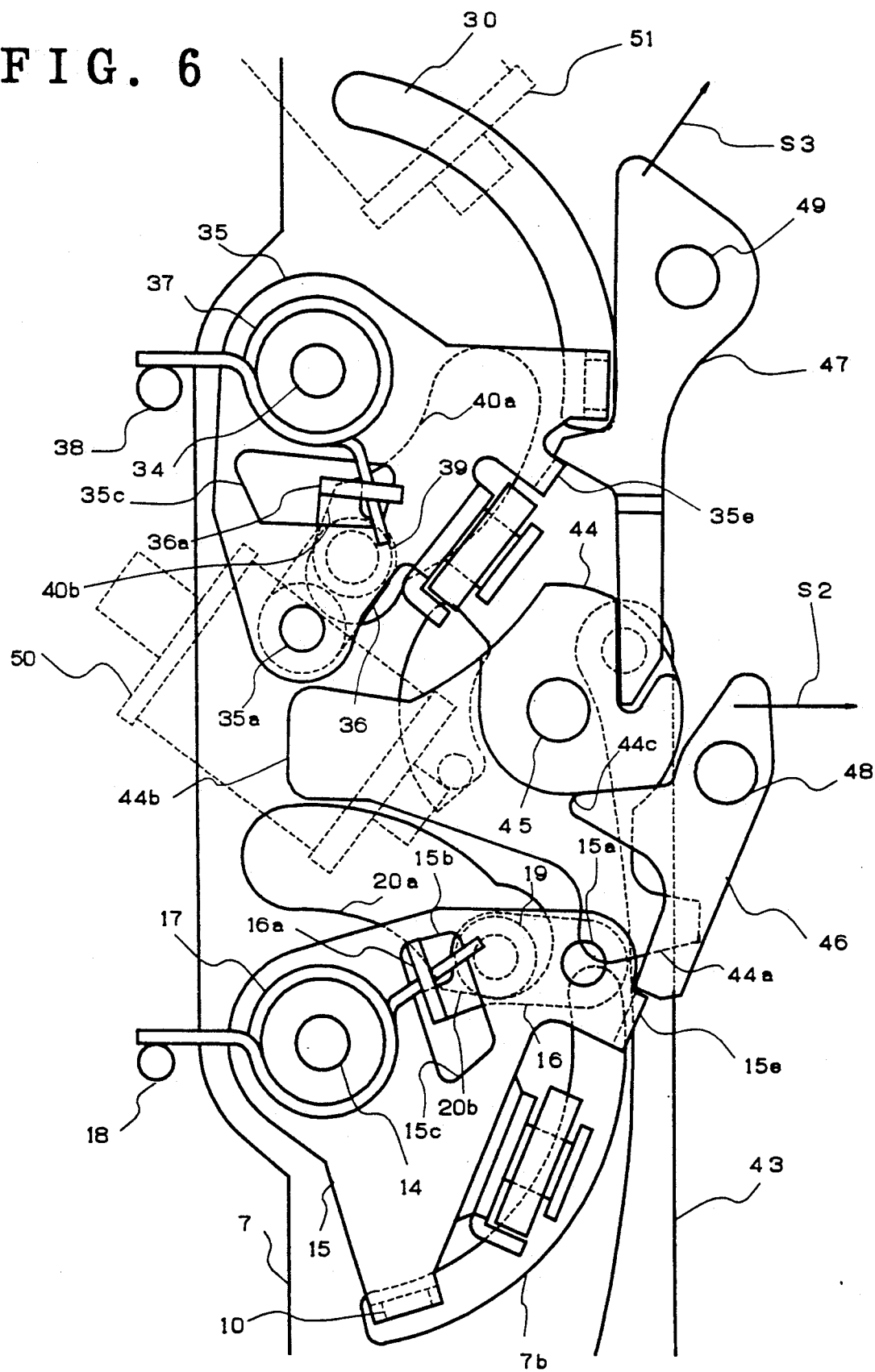
FIG. 6 is a partial plan view of the mechanism shown in FIG. 2 in which the first and second blades are engaged at the end of forward movement.

The state at this time is shown in FIG. 6.

As described above, after the exposure operation has been finished, the set lever 41 is rotated clockwise about the shaft 42 against the force of the spring S1 in interlocked relationship with a film winding operation performed by a motor or manually, so that the set cam 44 is rotated clockwise through the set link 43.

Since the cam surface 44c formed on the set cam 44 rotates the first blade stopper 46 about the shaft 48 in response to the clockwise rotation of the set cam 44, the engagement between the first blade stopper 46 and the engagement projection 15e of the first blade driving lever 15 is released.

Figure 7:
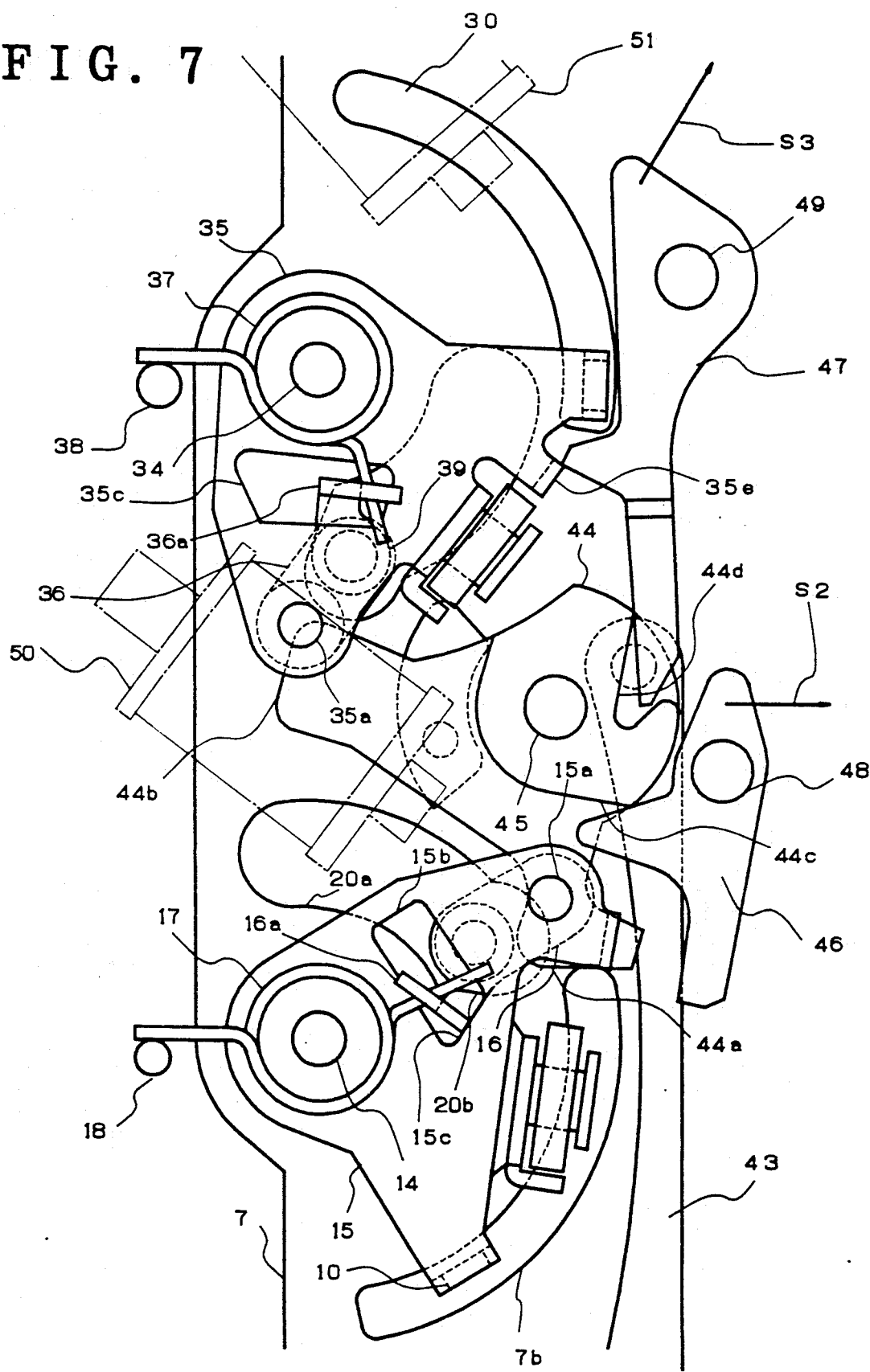
FIG. 7 is a partial plan view showing the mechanism in which the engagement of the first blade at the end of forward movement is released.
Figure 8:
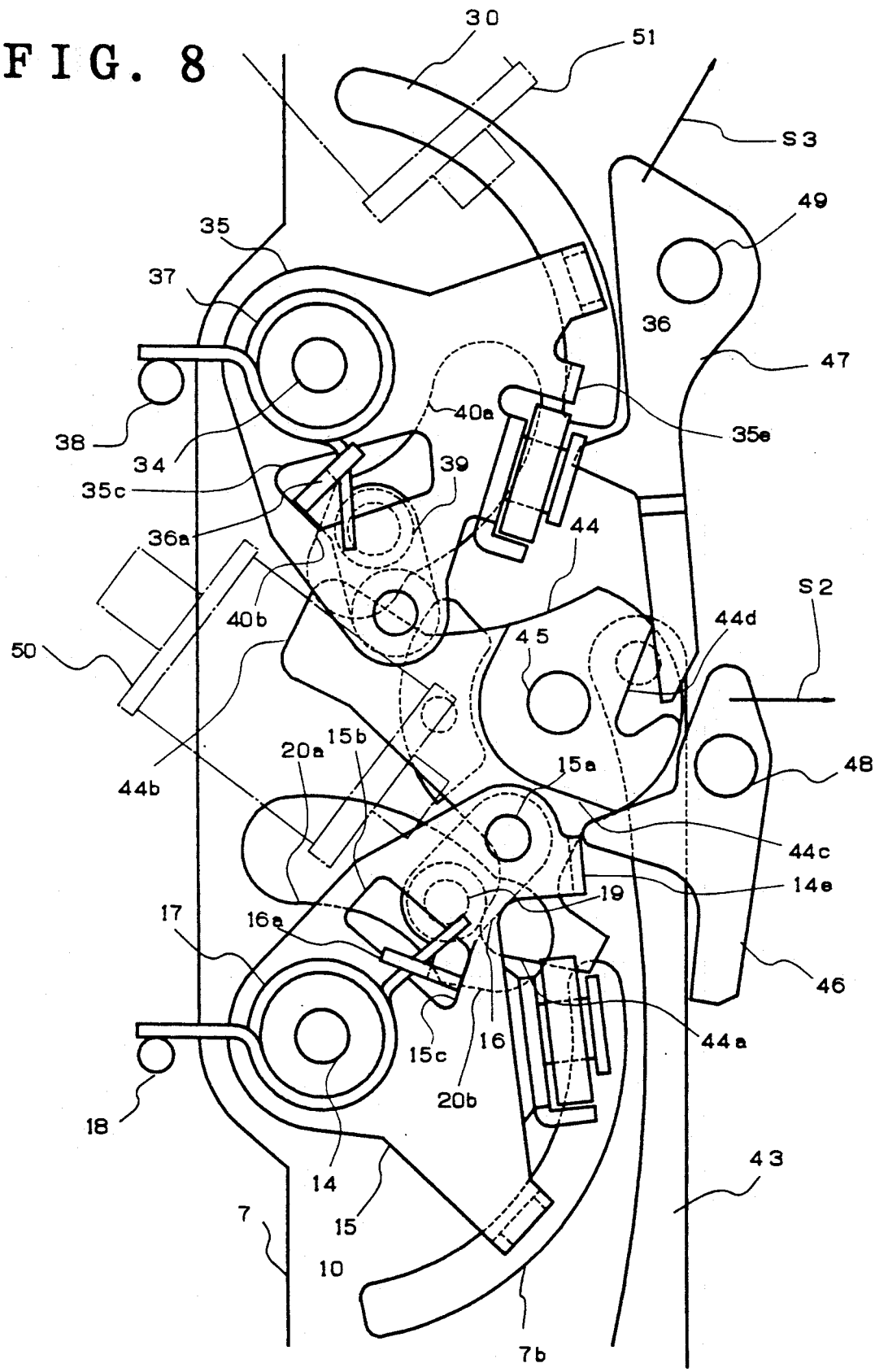
FIG. 8 is a partial plan view showing the mechanism shown in FIG. 2 in which the engagement of the second blade at the end of forward movement is released.
Figure 9:
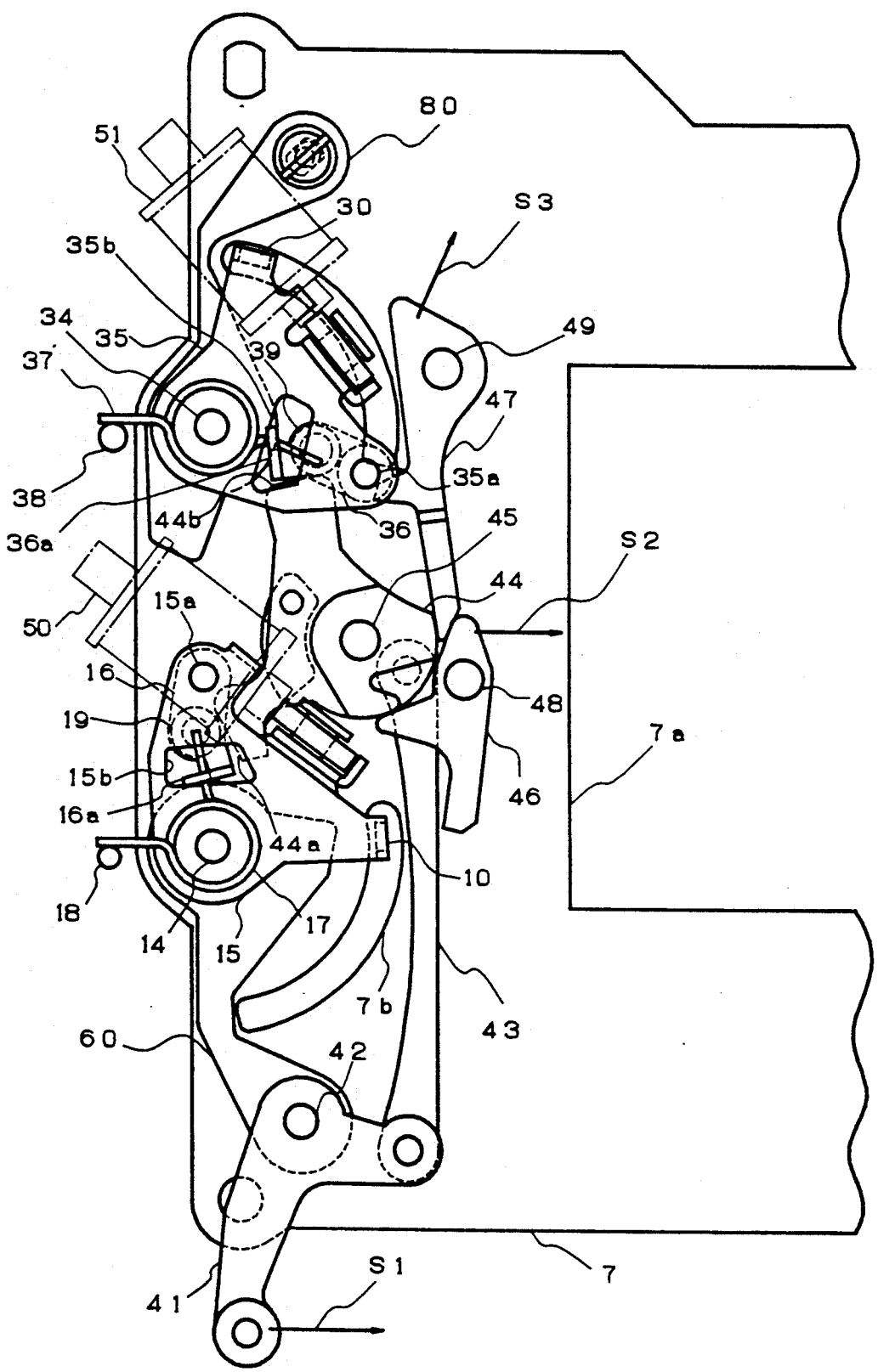
FIG. 9 is a plan view of a shutter driving mechanism in a shutter set state according to another embodiment of the present invention.
Figure 10:
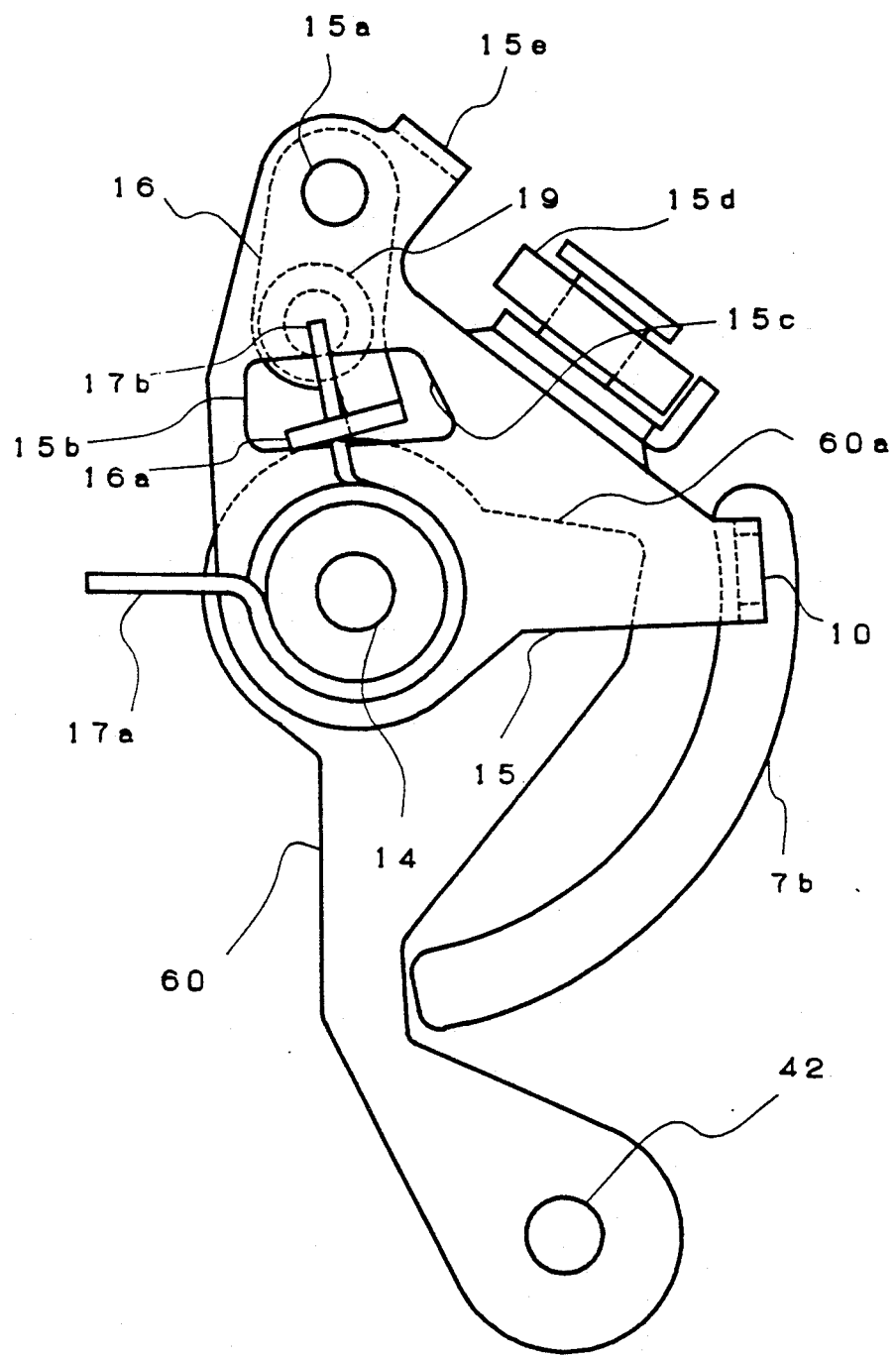
FIG. 10 is an enlarged view of a driving mechanism of a first blade side in the mechanism shown in FIG. 9.
Figure 11:
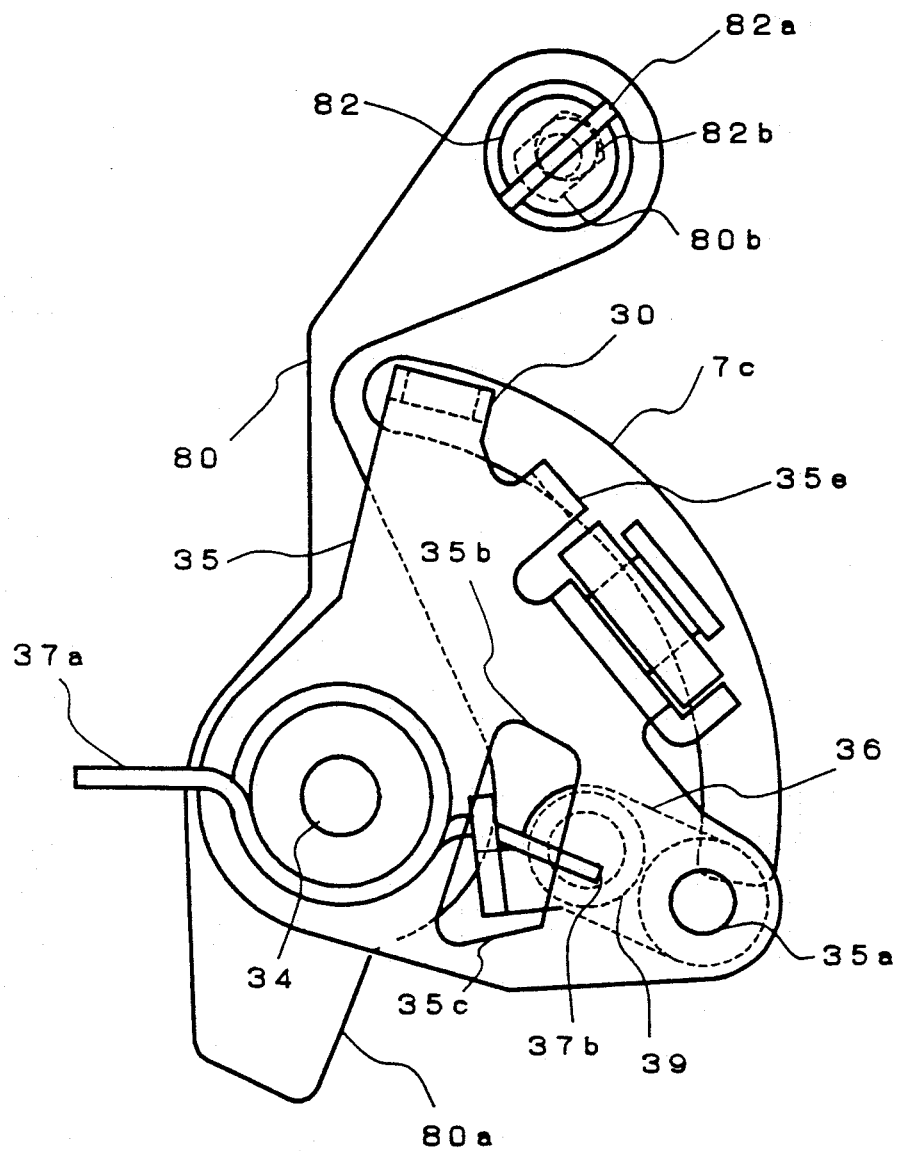
FIG. 11 is an enlarged view of a driving mechanism of a second blade side in the mechanism shown in FIG. 9.

At this time, since the force of the torsion spring 17 reversed by the reversing lever 16 at the cam follower 19 serving as a fulcrum is transmitted to the first blade driving lever 15, the first blade driving lever 15 is rotated counterclockwise until the edge 15c of the hole 15b comes into contact with the bend portion 16a of the reversing lever 16. The state at this time is shown in FIG. 7.

When the set cam 44 is further rotated clockwise, the cam surface 44d formed on the set cam 44 rotates the second blade stopper 47 counterclockwise about the shaft 49 and accordingly the engagement between the second blade stopper 47 and the engagement projections 35e of the second blade driving lever 35 is released. Thus, the second blade driving lever is also rotated counterclockwise by the force of the torsion spring 37 until the edge 35c of the hole 35b comes into contact with the bend portion 36a of the reversing lever 36. The state at this time is shown in FIG. 6.

In the embodiment, since there is a slight time difference between the release of the engagement in the first blade group and the second blade group, there is no possibility that the aperture for exposure is opened during the returning of the blade groups.

Thereafter, when the set cam 44 is further rotated clockwise, the cam surface 44a formed on the set cam 44 abuts against the cam follower 19 for the first blade group and the cam surface 44b formed on the set cam 44 abuts against the cam follower 39 for the second blade group, so that the first blade driving lever 15 and the second blade driving lever 35 are rotated counterclockwise to return to the initial state shown in FIGS. 2 and 4.

A second embodiment shown in FIGS. 9-12 will now be described. Portions of the second embodiment corresponding to those of the first embodiment are designated by the same reference numerals as those in the first embodiment, and duplicate description is omitted. Elements different from the first embodiment are described.

In the first embodiment, the moving loci of the cam followers 19 and 39 are restricted by the groove cams 20 and 40 formed in the base plate 7, while in the second embodiment the moving loci of the cam followers 19 and 39 are respectively restricted by cam means in the form of a cam plate 60 for the first blade group and a cam plate 80 for the second blade group fixedly mounted to the base plate 7.

In addition, in the second embodiment shown in FIGS. 9-12, two methods of mounting the cam plate 60 for the first blade group and the cam plate 80 for the second blade group are illustrated.

The cam plate 60 for the first plate blade group is fixedly mounted to the base plate 7 by means of the shaft 42 of the set lever 41 and the shaft 14 of the first blade driving lever 15.

Formed on the cam plate 60 is a cam profile 60a for restricting the cam follower 19 from continuing the arcuate rotation about the shaft 14 in the second half part of the clockwise rotation of the first blade driving lever 15. The cam profile 60a is formed at a position in which the cam follower 19 abuts against the cam profile 60a before the first blade driving lever 15 reaches the end of forward movement, and the shape of the cam profile 60a is set so that a tangent line of the moving locus formed by the cam follower 19 just before the cam follower 19 comes into contact with the cam profile 60a intersects the cam profile 60a in an obtuse angle. The cam profile 60a performs the same operation as that of the second profile portion 20b of the groove cam 20 of the first embodiment.

The method of mounting the cam plate 80 of the second blade group on the base plate 7 is different from that of the cam plate 60 of the first blade group.

More particularly, the cam plate 80 of the second blade group is fixedly mounted on the base plate 7 so that the position of the cam plate 80 can be adjusted by the shafts 34 and 82 of the second blade driving lever 35.

Figure 12:
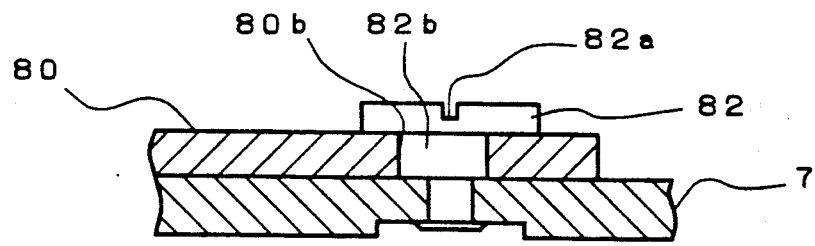
FIG. 12 is a sectional view showing a mounting structure of a cam plate of the second blade side in the mechanism shown in FIG. 9.

FIG. 12 is a sectional view showing a portion of the shaft 82. A groove 82a for adjustment is formed in a head of the shaft 82. The shaft 82 extends through an adjustment groove 80b formed in the cam plate 80 and is screwed into the base plate 7. Since the shaft 82 is formed with an eccentric part 82b having a diameter equal to that of an inner diameter of the adjustment groove 80b, the cam plate 80 can be rotated by a slightly small angle about the shaft 34 by properly rotating the shaft 82 by means of a tool inserted into the groove 82a.

Formed on the cam plate 80 is a cam profile 80a for restricting the cam follower 39 from continuing the rotation about the shaft in the second half of the clockwise rotation of the second blade driving lever 35. The cam profile 80a is formed at a position at which the cam follower 39 abuts against the cam profile 80a before the second blade driving lever 35 reaches the end of forward movement and the shape of the cam profile 80a is formed so that the tangent of the moving locus formed by the cam follower 39 just before the cam follower 39 comes into contact with the cam profile 80a intersects the cam profile 80 a at an obtuse angle. Such structure is the same as that of the cam 60 for the first blade group. However, the angle of the cam profile 80a can be finely adjusted by rotating the cam plate 80 about the shaft 34 by a very small angle as described above. The cam profile 80a performs the same operation as that of the second profile portion 40a of the groove cam 40 of the first embodiment.

Accordingly, even in the second embodiment, the force of the springs 17 and 37 is transmitted to the driving levers 15 and 35 through the reversing levers 16 and 36 as the propelling force until the cam followers 19 and 39 reach the cam profile portions 60a and 80a while the force of the springs 17 and 37 is transmitted to the driving levers 15 and 35 through the reversing levers 16 and 36 as a braking force after the cam followers 19 and 39 have reached the cam profile portions 60a and 80a, so that shock and oscillation at the end of forward movement are reduced.

As described above, according to the present invention, since the single spring is utilized as a source of driving force for moving the shutter blades until the middle of the movement of the shutter blades, and is utilized as a source of force for braking the shutter blades after the middle of the movement of the shutter blades, it is not necessary to provide a separate braking spring and space for accommodating a braking mechanism unneeded.

Further, according to the present invention, since the shock absorption mechanism does not have any member exerting friction, the shock absorption mechanism is not affected by variation of the coefficient of friction due to variation in temperature, and a stable aperture characteristic of the shutter can be attained regardless of the environment of use of the camera. Further, the shock absorption capability of the shock absorption mechanism is not reduced by wearing of a friction member.

In addition, as described above, in the present invention, since the spring for driving the shutter is operated as the source of force for braking the shutter, it is not necessary to provide a braking mechanism separately from the shutter driving mechanism and an increased amount of set force is not needed.

Furthermore, in the present invention, since only the reversing lever is added to the mechanism and a setting roller can use the cam follower mounted on the reversing lever, the structure is extremely simple.

If the passing locus of the cam follower is set to be an obtuse angle at a point at which the passing locus varies from the arcuate locus of the driving lever about the rotation axis to the direction of separating from the axis of the driving lever, a member for producing substantial collision is not provided and wearing due to collision is extremely reduced.

Further, if the mounting position of the cam plate can be adjusted, adjustment can easily be made so that ideal shock absorption performance is attained within a range capable of moving the blade groups to the end of forward movement exactly and adjustment of the shock absorption performance during repair or the like can be easily made.

We claim:

1. A driving mechanism for a focal plane shutter comprising:
   a blade group including a plurality of individual blades for closing an exposure aperture formed in a shutter base plate by spreading said plurality of blades from an overlapped state and for opening said aperture by overlapping said plurality of blades from a spread state;
   a driving lever swingably mounted around a shaft on said base plate and coupled with each of said plurality of blades constituting said blade group to move said blades between the spread state and the overlapped state;
   a reversing lever swingably mounted on a shaft on said driving lever at a position different from the shaft on which said driving lever is mounted and being rotatable in a restricted relative rotation range with respect to said driving lever;
   a cam follower mounted on said reversing lever between the shaft on which the reversing lever is mounted and a free end of said reversing lever;
   energizing means having an operation end engaged with the free end of said reversing lever to urge said reversing lever in a direction for moving said driving lever toward an end of forward movement of said driving lever;
   releasing means engagable with said driving lever for releasing said driving lever from an initial position thereof; and
   a cam means having a cam profile with which said cam follower is engaged and including a first profile portion for leading said cam follower along an arcuate locus about the shaft on which said driving lever is mounted in a former part of movement of said driving lever from the initial position thereof to the end of the forward movement thereof, and a second profile portion for restraining rotation of said cam follower about the shaft on which said driving lever is mounted in a latter part of the movement of said driving lever from the inital position to the end of forward movement thereof.

2. A driving mechanism as claimed in claim 1 in which tangent lines to said cam profile portions at a point where said first profile portion is joined to said second profile portion intersect at an obtuse angle.

3. A driving mechanism as claimed in claim 1 in which said cam means is a cam opening in said shutter base plate.

4. A driving mechanism as claimed in claim 3 in which tangent lines to said cam profile portions at a point where said first profile portion is joined to said second profile portion intersect at an obtuse angle.

5. A driving mechanism according to claim 1 further comprising a set lever means connected to said driving lever for moving said driving lever from the end of the forward movement thereof to the initial position of the driving lever, said set lever means being engaged with said cam follower during said moving of said driving lever.

6. A driving mechanism for a focal plane shutter comprising:
   a blade group including a plurality of individual blades for closing an exposure aperture formed in a shutter base plate by spreading said plurality of blades from an overlapped state and for opening said aperture by overlapping said plurality of blades from a spread state;
   a driving lever swingably mounted around a shaft on said base plate and coupled with each of said plurality of blades constituting said blade group to move said blades between the spread state and the overlapped state;
   a reversing lever swingably mounted on a shaft on said driving lever at a position different from the shaft on which said driving lever is mounted and being rotatable in a restricted relative rotation range with respect to said driving lever;
   a cam follower mounted on said reversing lever between the shaft on which the reversing lever is mounted and a free end of said reversing lever;
   energizing means having an operation end engaged with the free end of said reversing lever to urge said reversing lever in a direction for moving said driving lever toward an end of forward movement of said driving lever;
   releasing means engagable with said driving lever for releasing said driving lever from an initial position thereof; and
   a cam means having a cam profile positioned in a path of movement of said cam follower around the shaft on which said driving lever is mounted and having a cam profile for restraining movement of said cam follower along said path and being engaged by said cam follower as said cam follower is moving along said path as said driving lever is moving from the initial position toward the end of forward movement, said position being at a point reached by said cam follower before said driving lever reaches the end of forward movement thereof.

7. A driving mechanism as claimed in claim 6 in which a tangent to said cam profile intersects a tangent to the path of movement of said cam follower at an obtuse angle.

8. A driving mechanism as claimed in claim 6 in which said cam means comprises a cam plate adjustably mounted on the shutter base plate.

9. A driving mechanism as claimed in claim 8 in which a tangent to said cam profile intersects a tangent to the path of movement of said cam follower at an obtuse angle.

10. A driving mechanism according to claim 6 further comprising a set lever means connected to said driving lever for moving said driving lever from the end of the forward movement thereof to the initial position of the driving lever, said set lever means being engaged with said cam follower during said moving of said driving lever.

* * * * *